United States Patent [19]

Davidson

[11] Patent Number: 4,706,800

[45] Date of Patent: Nov. 17, 1987

[54] DEVICE FOR CONVEYOR TRACKS

[76] Inventor: Mats I. Davidson, Djupadal, 502 78 Gånghester, Sweden

[21] Appl. No.: 883,868

[22] PCT Filed: Sep. 17, 1981

[86] PCT No.: PCT/SE81/00268

§ 371 Date: May 7, 1982

§ 102(e) Date: May 7, 1982

[87] PCT Pub. No.: WO82/00990

PCT Pub. Date: Apr. 1, 1982

Related U.S. Application Data

[63] Continuation of Ser. No. 705,857, Feb. 27, 1985, abandoned, which is a continuation of Ser. No. 380,725, May 7, 1982, abandoned.

[30] Foreign Application Priority Data

Sep. 17, 1980 [SE] Sweden .............................. 8006508

[51] Int. Cl.⁴ ............................................ B65G 17/32
[52] U.S. Cl. .................................... 198/685; 198/833; 198/844; 474/205; 474/251
[58] Field of Search ............... 198/678, 683, 685, 711, 198/834, 835, 844, 854, 833, 686; 104/165; 474/202, 204, 205, 251, 255, 249, 250; 24/17 A, 17 P, 30.5 P, 16 P, 16 B

[56] References Cited

U.S. PATENT DOCUMENTS

| | | | |
|---|---|---|---|
| 2,405,496 | 8/1946 | Gingras | 474/249 X |
| 2,514,429 | 7/1950 | Waugh | 474/251 |
| 2,823,789 | 2/1958 | Henning | 198/834 X |
| 3,164,238 | 1/1965 | McCullagh | 198/833 X |
| 3,645,375 | 2/1972 | Gelzer | 198/648 X |
| 3,749,224 | 7/1973 | Engeler | 198/833 X |
| 3,988,941 | 11/1976 | Smith | 474/251 |
| 4,084,687 | 4/1978 | Lapeyre | 198/844 |
| 4,147,069 | 4/1979 | Derner | 474/204 X |
| 4,170,281 | 10/1979 | Lapeyre | 198/844 |
| 4,298,343 | 11/1981 | Redmond, Jr. | 474/255 |

FOREIGN PATENT DOCUMENTS

| | | | |
|---|---|---|---|
| 1728516 | 2/1974 | Fed. Rep. of Germany | 104/165 |
| 2853593 | 6/1979 | Fed. Rep. of Germany | 474/251 |
| 6642 | of 1885 | United Kingdom | 474/205 |
| 714022 | 8/1954 | United Kingdom | 198/844 |

Primary Examiner—Joseph E. Valenza
Assistant Examiner—Jonathan D. Holmes

[57] ABSTRACT

A device for use with conveyor tracks, comprising a continuous drive element (2), arranges so as to be moved by drive device (30) on a track with steering mechanisms for the drive element and load-carrying elements moving along the track, they being equipped with attachment devices (28) to the driving element in such a manner that they can accompany the same in their movements for the transport of materials. Drive element (2) has the shape of a band with corrugations, between which are constructed transverse grooves. The material in the drive element is hard and resilient and is preferably composed of a stiff plastic material and is dimensioned in such a way that the corrugations and hence the grooves in general retain their shape during the intended drive resistance and the intended load under the effect of the pointwise applying driving elements (30). At the same time, the corrugated shape of the drive element and its resilience are so designed that, in spite of its relative stiffness it can be given a continuous curvature in a number of planes or twisting from the effect of the steering mechanisms.

6 Claims, 4 Drawing Figures

DEVICE FOR CONVEYOR TRACKS

This application is a continuation of application Ser. No. 705,857, filed Feb. 27, 1985, now abandoned which in turn is a continuation of Ser. No. 380,725, filed May 7, 1982, now abandoned.

TECHNICAL FIELD

The invention refers to a device for conveyor tracks equipped with a continuous driving element.

BACKGROUND

There is in existence a common type of conveyor track, normally equipped with an endless driving element, which either supports or propels elements carrying materials. An example of a common type of conveyor track is a chain conveyor, where an endless chain runs over a driving and supporting wheel and either sustains elements carrying materials, such as plates or holders, or conveys materials in such a way that they are then transferred to a separate track but are sent forward by the chain. For conveyor tracks of this type the drive device must be so designed that the load-carrying elements can be attached to it in a reliable manner and use the simplest possible mechanisms, while at the same time the device must functionally work in combination with conveyance mechanisms using for example a sprocket. Such requirements often means that the driving element is constructed in the form of a chain, as in the example quoted, since the links of a chain afford good possibilities for adaptation to the attachment of goods-carriers and for a shape suitable for combination with the driving mechanism.

Technical problem:

The production of a chain involves a relatively complicated, and from the manufacturing point of view, expensive element of machinery. Even more complicated is a chain that has to bend in several planes and hence for the most part conveyor chains are made to bend in one plane only, in which case use is made of the bending property to carry a chain over the sprocket to an underlying or possibly over or lateral return coupling. This means that the conveyor track can only bend in the same direction as the plane along which the driving sections and the return section lie. In the case of a conveyor track with drive and return sections one above the other, it is possible only to raise or lower the conveyor and it cannot be shifted laterally. No torsion is possible. Of course there exist chains with dual link rings, which permit bending in several planes, but these are highly complicated and bulky.

In order to eliminate the use of complicated and expensive chains with limited bending capacity, there have been proposals to employ more continuous elements, such as lines or belts, although the latter would also have limited bending properties for sideways movement. With such elements, however, the useful property, previously referred to, of fastening the load-carrying elements and of obtaining drive coupling with the driving elements, would be lost. In general, it is necessary with such continuous elements to rely on friction joints of limited reliability instead of joined shapes. Additionally, difficulties often arise when joining or splicing sections of this type of element.

The solution:

In this invention, the driving element is shaped like a band with corrugations, between which a drive element with transverse grooves is mounted, the material in the driving element being hard and resilient and composed primarily of stiff plastic material.

Advantages:

The invention in question is for the purpose of obtaining a device for conveyor tracks in which the driving element combines advantages from both these principal types, so that the driving element can be connected to the load carrier element and the drive mechanism is completely flexible and torsionable and additionally can easily be spliced without leaving any gaps.

Another purpose of the invention is to procure a driving element which can be well adapted to production by modern manufacturing techniques and at low cost for both production itself and the associated tooling.

BRIEF DESCRIPTION OF DRAWINGS

The manufacturing configurations for the invention are described in the attached drawings where.

BEST MODE OF CARRYING OUT THE INVENTION

Figure 1:
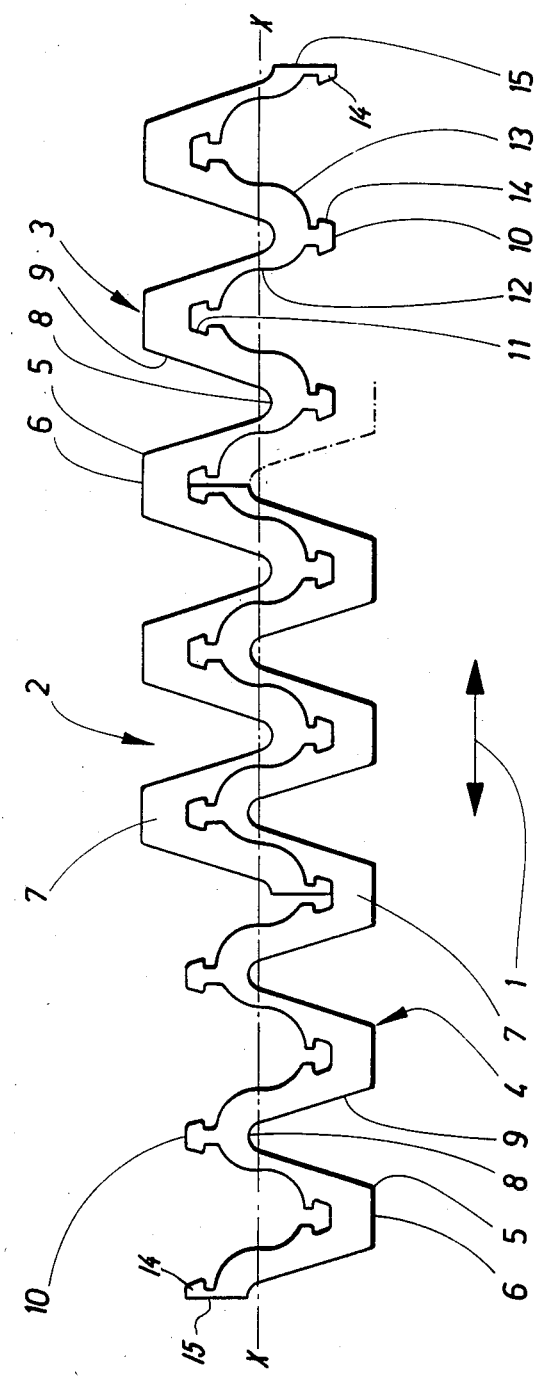
FIG. 1 shows a part of the driving element in side view.

Essential to the technical effect of the invention is the driving element of the conveyor track, as shown in FIG. 1. It can best be described as a corrugated band on which the corrugations follow each other lengthwise along the driving element, marked by arrow 1 in FIG. 1. FIG. 1 shows only a short section of the driving element, and the intention is that it should have a substantial length and preferably should be endless and run along an endless track in which case the length of the driving element would be more than double the selected conveyor run, since there would have to be a return section. Nevertheless, it is conceivable that a driving element could work with a forward and backward movement and would not then need to be endless.

To achieve the technical effect, i.e. to make the drive element sufficiently standard in shape to enable it to be coupled to and drive forward the carrier element and be attached to the driving device, while at the same time being sufficiently flexible to ensure that it can be bent and twisted in all directions, it will be necessary for the material of the corrugated band to be relatively stiff but nevertheless somewhat flexible and for the thickness of the material to be sufficiently great to furnish the required stiffness. At the same time, the shaping, i.e. the depth of the corrugation in comparison with the rigidity and thickness of the material, must be such that the driving element will permit assembly with bending and twisting in different planes. Every part of the driving element, seen over a shorter length, shall in fact be as stiff as possible and rigid enough to ensure that no serious changes in shape appear when the carrier element or the driving device engages with the surfaces of individual corrugations, used for coupling between the carrier elements and driving devices on the one hand and the driving element on the other. By manufacturing the driving element as a corrugated band described as follows, these partly self-contradictory desiderata can be achieved. Important for making possible a selected form-reshaping and simultaneously limiting an undesired form-reshaping is that the element be manufactured so that it can be steered in its track by suitable steering devices.

Figures 2, 3:
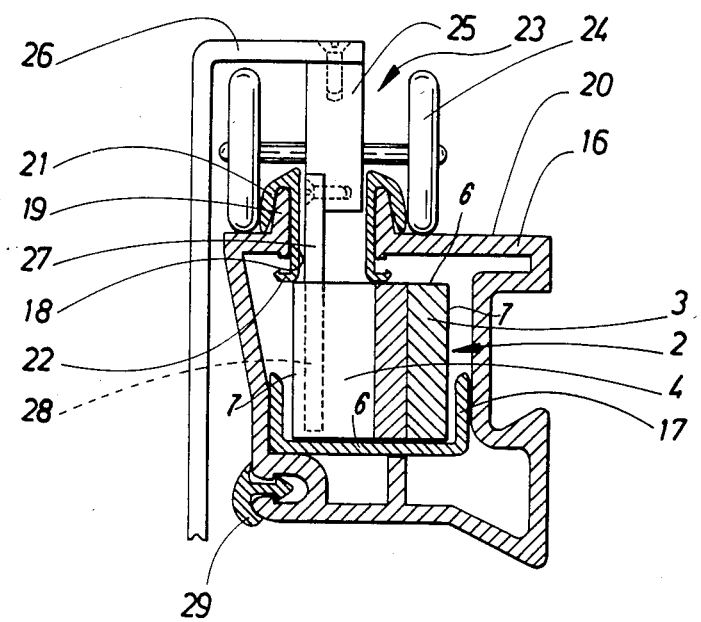
FIG. 2 a section through a conveyor track.
FIG. 3 in perspective the driving device for the conveyor track.

As will appear from FIG. 1, driving element 2 is composed of joined units of, first, a type 3 and secondly a type 4 which both display a corrugated shape. Units of both types show a corrugation-shaped running outer side 5 with exterior surfaces 6, which exterior surfaces 6 are located in two outer planes on opposite sides of element 2. The element has a central axis X—X. In end view, the driving element in FIG. 2 is mainly square-shaped with two of the sides of the square composed of outer surfaces 6 and the other two of the two side surfaces 7, which fix the breadth of the corrugated band. Between outer surfaces 6, V-shaped grooves 8 with sides 9 extend inwards.

Outer sides 5 of units 3 and 4 form the outer sides of driving element 2 since, as will be seen from the middle section in FIG. 1, units 3 and 4 of both types are made and joined to each other with only exterior surfaces 5 free. The sides of units 3, 4 laid together against each other, will hereinafter be called inner sides 10. These appear in the middle of outer surfaces 6, groove 11, joined with rounded surfaces 12 extending inwards, with a narrow passage. The inner parts of grooves 11 are extended. Outer parts 13 of inner side 10 show a projection 14 with in general the same sectional profile as groove 11. The rounded inwards-running surfaces 12 extend along outer groove sides 9, hence the thickness of material between surfaces 9 and 12 is less on one side of the cavity formed by surfaces 12 than on the other.

The profile of the inner sides of the units is such that they can be interlocked. Their ends thus finish at surfaces 15 severing final projection 14 down the middle. Because of the previously mentioned asymmetrical material thickness, units 3 and 4 in FIG. 1 do not appear the same but are a mirror image of each other. If, nevertheless, the surfaces on inner sides 10 are parallel, as shown in FIG. 1, units 3 and 4 can be alike internally since they join together in an internally reversed position. By locking the units when joining, as shown in FIG. 1, so that the units on one side always overlap the splices between the units on the other sides (compare dotted line in FIG. 1), a driving element of desired length can be formed of similar, short sections, which can be prepared by die casting in stiff plastic material at low cost for both manufacture and tooling. Endless drive elements can also be made.

As stated initially, the corrugated band, such as drive element 2 of a rather full length, will have a substantial capacity for modification of shape resulting from its basic form. This property can be controlled by altered forming with larger or smaller material thicknesses. The depth of groove 8 is also of significance and in particular the overlapping between grooves, i.e. the distance along which grooves from one side of the element penetrate the line along which the bottoms of the grooves from the other side are positioned. Without overlapping a certain bending in both planes is achieved, but on the other hand no stretch or compression possibilities are obtainable apart from that permitted by the material's own stretch or compression properties in the middle section. In certain cases it may, however, happen that an unstretchable driving element is wanted and in that case the groove depth can be limited.

As also stated, the driving element shall be sufficiently stiff to permit of the connection of carrier elements and driving devices to occur in grooves 8. In that case, the requirement to be met is that, during driving resistance and loading, the element must not straighten itself out so that the corrugations and hence the grooves change their shape appreciably owing to pitting by the driving device. This is achieved by preventing the material thickness from becoming too small and by choosing a relatively stiff material. A stiff amide resin which can be die cast is an example of a suitable choice of material. The asymmetry referred to in the distribution of material limits pliability in the materials between two opposing grooves 8, which are divided into two panels by the junction of the two units 3 and 4. If distribution is similar, what has been forthcoming is two unjoined layers of material with a sectional height equivalent to half the material thickness. Asymmetrical division, on the other hand, yields a thicker layer and a thinner layer, which with non-secured layers gives higher bending resistance pro rata to the thickness that can be imparted to one of the layers. The demonstrated proportions for the driving element have in practice shown themselves to be a good compromise between the desire for form-shaping capacity in the driving element and that for good surface resistance and good power-transmission capacity for the smallest possible quantity of materials.

Where there is a need for length adjustment of the driving element to shorter stages than the modular length furnished by the lengths of units 3 and 4, one or more units can be removed at the middle of projection 14. In this manner length adjustment down to the module one groove distance can be carried out. With reasonable length on the driving element this stage too can be surmounted by the stretch capacity of the driving element if performed with overlapping grooves.

In FIG. 2 driving element 2, shown in section, is set in a steering procedure. The latter is composed of an aluminum spar 16, in which has been inserted a U-rail 17 of a material with good sliding properties vis-a-vis the material of driving element 2. Aluminum spar 16 has at the upper side an opening 18, which is capped by upward-pointing flanges 19. Upper side 20 of the spar from which flanges 19 project are shaped like a flat roller-way. The sides of flanges 19 and openings 18 are shielded by two profiles 21 of a material with good sliding and abrasive qualities. Profiles 21 expose lower collar flanges which form a support from above for driving element 2. Driving element 2 therefore lies in U-flange 17 and is removed from its base and steered by its flanges, obtaining a certain degree of support from flanges 22 from above. As will be apparent also from FIG. 3, the driving element is so mounted that its sides 7 are pointed upwards and downwards and hence grooves 8 are open at both sides.

Grooves 8 can therefore be employed for driving the carrier element. FIG. 2 shows one such carrier 23 with wheels 24, which can run along the upper side 20 of spar 16 and is thereby steered by flanges 19 via profiles 21. The carrier conveys a load holder 26 via a center-piece 25, which can have the shape of a hook, a bowl or practically speaking any kind of carrier, depending on the nature of the goods to be conveyed. From center-piece 25 a transporter 27, with two fingers 28, sunk in two grooves to driving element 2, stretches downwards, (see also FIG. 3). FIG. 2 shows also how spar 16 can have a sliding bar 29 at the extreme base to form a support for load-holder 26 in case the latter should swing.

The drive system for driving element 2 is shown in FIG. 3. According to the figure the drive element here forms an endless belt, running over a long-distance track. At the middle point of the track, where the parts of the driving element travel parallel with each other, there are two toothed wheels 30 which clamp inwards-facing grooves 8 to the drive element. Working of the toothed wheels is controlled by intervening pulley 31, which via belt 32 operates the toothed wheels with an electric motor (not shown) as power source. Spar 16 appears in the middle of the toothed-wheel entries through which the toothed wheels extend to the driving element. In general the spar can be of the same section and manufacture over the whole of its length and the track formed by the spar is likewise endless. This track can be assembled from several units such as straight, bent in one or more planes and even twisted units. The movement of the driving element is not impeded by relatively extensive bending and twisting, in fact the former assists the re-shaping process because of steerage by the track formed by the spars. For very long tracks several driving points can be arranged and synchronisation obtained via the driving element. It is likewise possible to drive devices from the driving element, e.g. a discharging unit or stripper for materials on the carrier.

The materials-carrier shown, as will be apparent, is loosely connected to the driving element and the desired number of carriers can be added to or removed from the track. It is even possible to allow the carriers to halt or change them over to another track by raising fingers 28 from the grooves of the driving element.

The carrier shown is not supported by the driving element but travels on wheels 24 on the track formed by spar 16. It is, however, also possible to permit one or more driving elements to prop up the carriers, which in that event will receive their support from the fixed track equipment (represented in FIG. 2 by spar 16) via the driving element. In this way the latter can run over rollers instead of by frictional slide on a bar. The driving element can even work if it is turned a quarter revolution and it can therefore run with its underside against cog wheels. In this situation, too, the advantages described are still present in the driving element.

Figure 4:
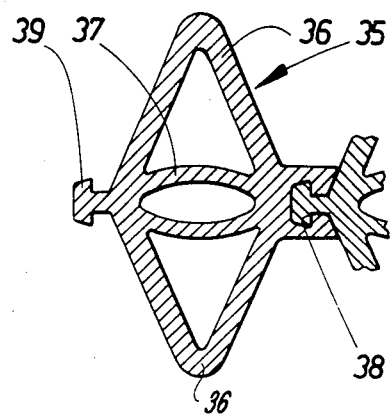
FIG. 4 a driving element of another production shape.

FIG. 4 shows an alternative design for the driving element. The element earlier described is, as explained, designed as a zig-zag shaped corrugated band. With the other design shape the corrugation is retained but here it can be said that the band is double and equipped with two parts running symmetrically abreast, with their corrugations pointing in opposite directions. This is the basic shape of the drive element, but as will subsequently be apparent the construction is different.

Thus, the driving element is constructed of individual links 35 with which, from a central section, emerge symmetrically placed outer side pieces 36 and inner side pieces 37. The links are united by a sliding joint with on one side a groove 38 and on the other side a projection 39.

If a number of links 35 are massed together with their end joints, a lengthy drive element is created, which is apparently composed of two outer corrugated bands, i.e. side pieces 36, and two inner bands with weaker corrugation, i.e. side pieces 37. As with the previously described drive element, the element can be attached in the same way to the materials-carrier and the driving device and can be supported by e.g. a slide or roller track. With this driving element, too, good bending and twisting in all directions is obtained. Because of the junction between links in the middle line, however, the penetrating grooves between side pieces 36 from the outer corner do not overlap each other with their bases but meet each other with their inswung sections at the centre line, which somewhat changes their re-shaping properties. Nevertheless, stretch and compression properties can be fixed with great accuracy by the shaping of, in particular, inner side pieces 37. Relatively slight bending of the side pieces 37 yields limited stretch whereas stretch decreases sharply when the link is stretched so that the inner side pieces are straightened out. Compression capacity is perhaps of less importance but with the passage of heavy loads it can be of great significance accurately to control stretch properties. It should incidentally be pointed out that a further increase in the capacity of the drive element to take up haulage loads can be achieved by the fitting of a haulage rope running through the links running between side pieces 37.

As shown in the last example and in order that the advantages of the invention can be secured, the drive element should thus not be manufactured as a simple corrugated strip but can have a multiple shape with two or more corrugated strips running in parallel.

I claim:

1. An elongated driving element for a heavy-duty, material-carrying conveyor, said driving element being made of yielding material and being movable by driving means on a track having guiding means for the driving element, said driving element being a band having a center axis, a first side on one side of said center axis, and a second side on the other side of said center axis, and longitudinally extending third and fourth sides perpendicular to said first and second sides, V-shaped grooves in said driving element, each V-shaped groove extending continuously across the entire width of said driving element between said third and fourth sides and having a base on one of said first and second sides and a body portion extending inwardly beyond said center axis toward the other of said first and second sides to have the apex of each groove located closely adjacent to said center axis and positioned so said center axis is located between said base and said apex, said first, second, third and fourth sides forming flat surfaces of substantial size for contact with the guiding means of the track, said V-shaped grooves being located in said first and second sides of said driving element and alternating along said center axis to define a zig-zag configuration with said center axis interrupted by said body portions of said grooves, whereby said driving element is bendable along said center axis in several planes and twistable about said center axis, said grooves in said driving element forming engagement means for supporting material-carrier elements movable along the track.

2. A driving element according to claim 1, wherein said driving element is composed of parts of limited length coupled to each other by a joint of coincident surfaces which engage one another, said parts overlapping each other.

3. A driving element according to claim 2, wherein each part has a first side forming an outer side of the drive element and which progresses in zig-zag fashion forming said grooves, and a second side likewise progressing in zig-zag fashion and following as a basic contour the zig-zag shape of said first side, whereby said driving element is composed of parts which are counterparts to each other, which turn their first sides outwards from each other and which are united at their respective second sides by means of said joint, said parts being so dimensionally displaced in relation to each other that the transverse joint formed between two consecutive parts on one side of the driving element is essentially in the center of one of the parts belonging to the other side of the driving element, and vice versa.

4. An element according to claim 3, wherein the first sides of the element are dimensionally displaced in relation to the second sides of the driving element, so that the walls of the driving element adjacent said grooves are of different thickness on opposite sides, the wall between grooves extending from both sides of the driving element being formed of a thinner section of the wall belonging to the part on the one side and a thicker section of the wall belonging to the part on the other side, and vice versa.

5. The combination of an elongated driving element for heavy-duty, material-carrying conveyor, said driving element being made of yielding material and being movable by driving means on a track having guiding means for the driving element, said driving element being a band having a center axis, a first side on one side of said center axis, and a second side on the other side center axis, and longitudinally extending third and fourth sides perpendicular to said first and second sides, V-shaped grooves in said driving element, each V-shaped groove extending continuously across the entire width of said driving element between said third and fourth sides and having a base on one of said first and second sides and a body portion extending inwardly beyond said center axis toward the other of said first and second sides to have the apex of each V-shaped groove located closely adjacent to said center axis and positioned so said center axis is located between said base and said apex, said first, second, third and fourth sides forming flat surfaces of considerable size for contact with the guiding means of the track, said V-shaped grooves being located on said first and second sides of said driving element and alternating along said center axis to define a zig-zag configuration with said center axis interrupted by said body portions of said grooves, whereby said driving element is bendable along said center axis in several planes and twistable about said center axis, and at least one carrier element movable along the track and having means engaging at least one of said V-shaped grooves.

6. An element in accordance with claim 5, wherein said carrier element is removably arranged in said at least one V-shaped groove for temporary coupling or uncoupling of the carrier element.

* * * * *